United States Patent [19]

Fergus et al.

[11] Patent Number: 4,899,457

[45] Date of Patent: Feb. 13, 1990

[54] VEHICLE FRAME MEASURING BRIDGE INCLUDING SPRING ACTUATED TELESCOPING LEGS

[75] Inventors: Dean Fergus, West Allis; Craig A. Wisner, Wauwatosa, both of Wis.

[73] Assignee: Hein-Werner Corporation, Waukesha, Wis.

[21] Appl. No.: 269,468

[22] Filed: Nov. 10, 1988

[51] Int. Cl.[4] .............................. G01B 3/38; G01B 5/14
[52] U.S. Cl. .......................................... 33/608; 33/286; 33/288
[58] Field of Search ........................... 33/608, 288, 286

[56] References Cited

U.S. PATENT DOCUMENTS

| | | | |
|---|---|---|---|
| 3,805,396 | 4/1974 | Hunnicutt | 33/608 |
| 3,869,804 | 3/1975 | Friend | 33/288 |
| 4,165,567 | 8/1979 | Olsson | 33/288 |
| 4,342,154 | 8/1982 | Legrand | 33/608 |
| 4,490,918 | 1/1985 | Clausen | 33/608 X |

OTHER PUBLICATIONS

Continental Collision Repair Systems, Alexandria, Minnesota under trademark "Continental Universal Measuring System, ©" 1987.
Car-O-Liner Company, Livonia, Michigan under the trademark Caroliner MK III, 1987.

Primary Examiner—Daniel M. Yasich
Attorney, Agent, or Firm—Michael, Best & Friedrich

[57] ABSTRACT

A measuring bridge including extensible legs supporting the measuring bridge into position beneath a vehicle. The extensible legs each include a compression spring for upward movement into engagement with the bottom of a vehicle frame. The measuring bridge also includes apparatus for adjustably positioning the pointers of the measuring bridge to compensate for variations in the size of reference holes provided in the vehicle frame.

11 Claims, 3 Drawing Sheets

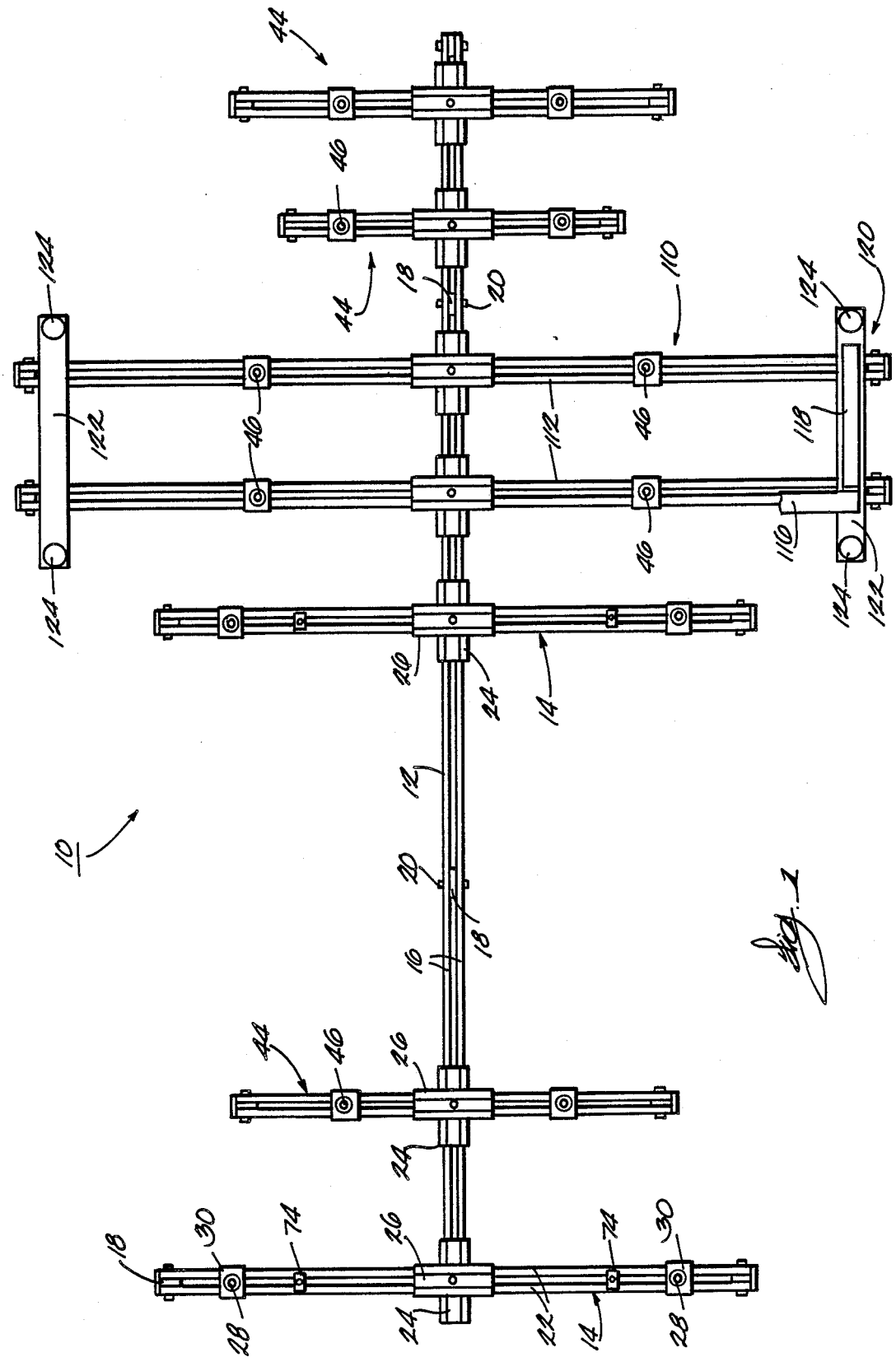

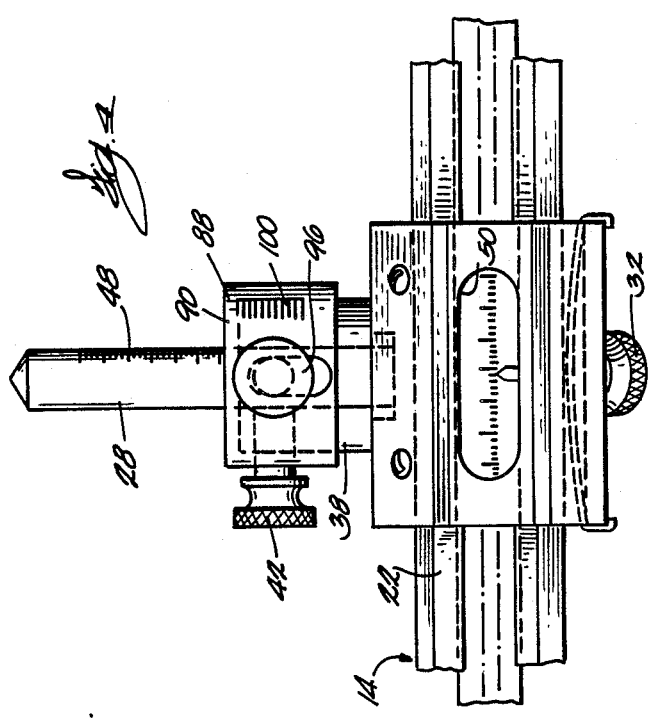
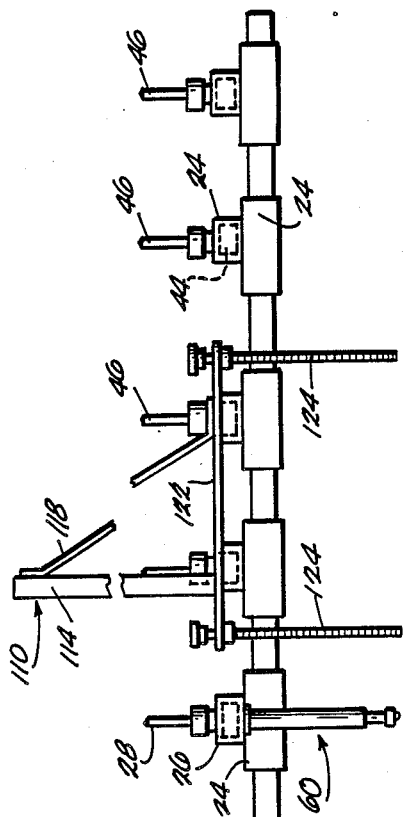
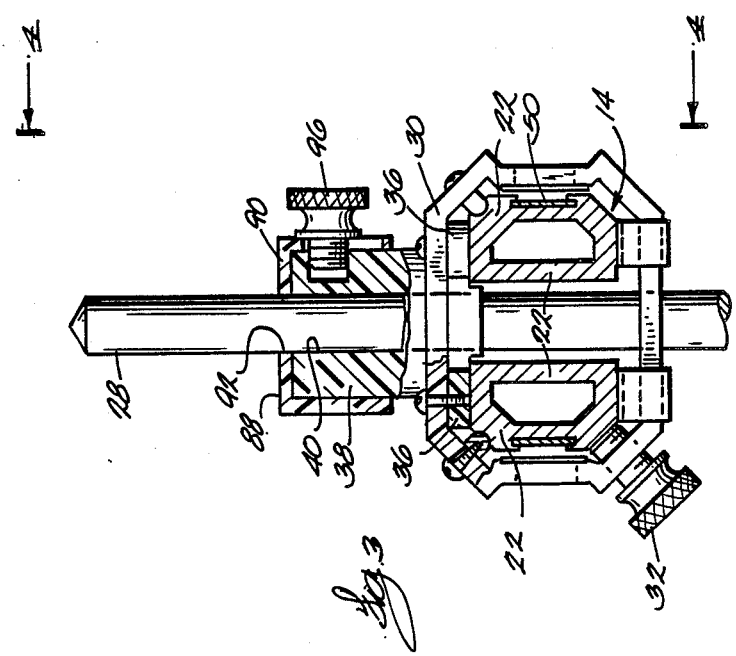
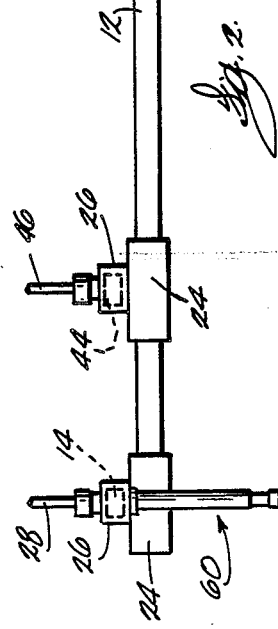

VEHICLE FRAME MEASURING BRIDGE INCLUDING SPRING ACTUATED TELESCOPING LEGS

FIELD OF THE INVENTION

The invention relates to apparatus for use in repair of vehicles and more particularly to measuring bridges used in measuring the relative position of various points of a vehicle with respect to reference points on the bottom of the vehicle frame.

BACKGROUND PRIOR ART

Measuring bridges for use in vehicle repair commonly include a frame supporting a plurality of upwardly extending set-up pointers adapted to engage reference points on the underside of the frame of a vehicle being repaired. The set-up pointers establish a horizontal reference plane beneath the vehicle. The measuring bridge also includes structure for supporting a plurality of measuring pointers for use in measuring the position of other points on the vehicle frame and the vehicle body with respect to the reference plane established by the set-up pointers. During vehicle repair, the mechanic can compare the relative positions of the points being measured with reference manuals to determine the extent of misalignment of these points and the amount of adjustment of the frame required for realignment. The measuring bridge is also used during vehicle repair to determine the accuracy of repairs made to a vehicle frame.

An example of a prior art measuring bridge is described in the Legrand U.S. Pat. No. 4,342,154, issued Aug. 3, 1982 and assigned to the assignee of the present invention. The measuring bridge illustrated in that patent illustrates a plurality of fluid actuated cylinders for raising the measuring bridge into position beneath a vehicle and for maintaining the measuring bridge in contact with the vehicle.

Attention is also directed to prior art measuring bridges of the type sold by Continental Collision Repair Systems, Alexandria, Minn. under the trademark CONTINENTAL UNIVERSAL MEASURING SYSTEM and by Car-O-Liner Company, Livonia, Mich. under the trademark CAROLINER MK III.

The pointers employed in measuring bridges commonly include conical upper ends adapted to engage holes provided in the vehicle frame. Vehicle manufacturers provide reference holes of various diameters, and accordingly, in measuring alignment of the vehicle, mechanics working on the vehicle must calculate factors compensating for variations in the extent of insertion of the conical ends of the set-up pointers in the reference bores depending on the diameter of the bore.

SUMMARY OF THE INVENTION

The present invention provides a measuring bridge including an improved support structure for supporting the measuring bridge for movement into position beneath a vehicle and for upward movement into engagement with the bottom of the vehicle frame, the means for supporting the measuring bridge including means for maintaining set-up pointers engaged against the bottom of the vehicle frame. The measuring bridge embodying the invention further includes compensating means for adjustably positioning the pointers of the measuring bridge to compensate for variations in the relative size of reference holes provided in the vehicle frame.

BRIEF DESCRIPTION OF THE DRAWINGS

FIG. 1 is a plan view of a measuring bridge embodying the invention.

FIG. 2 is a side elevation view taken along line 2—2 in FIG. 1.

FIG. 3 is a greatly enlarged cross-section view of a pointer embodied in the measuring bridge illustrated in FIGS. 1 and 2.

FIG. 4 is a view taken along line 4—4 in FIG. 3.

DESCRIPTION OF A PREFERRED EMBODIMENT

Figure 5:
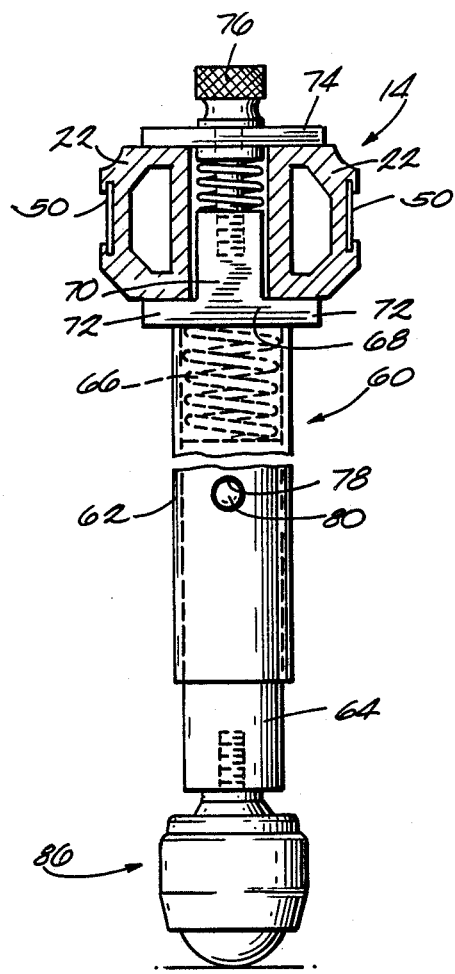
FIG. 5 is a greatly enlarged elevation view of a measuring bridge support leg included in the measuring bridge as shown in FIGS. 1 and 2 and with portions shown in cross-section.

Illustrated in FIG. 1 is a measuring bridge 10 embodying the invention and adapted to be positioned beneath the frame of a vehicle to be repaired. The measuring bridge 10 is used to measure damage or distortion of a vehicle frame resulting from a collision and to provide a means for establishing reference planes for realignment of the frame during repair of a vehicle. The measuring bridge 10 includes at least one central elongated main beam 12 and a pair of transverse set-up beams 14 positioned in spaced apart parallel relation and connected to the elongated main beam 12 for selective slideable movement along the main beam.

While the main beam 12 could have other constructions, in the illustrated arrangement it is comprised of a pair of elongated generally tubular aluminum extrusions 16 spaced apart by a plurality of spacers 18 and joined together by bolts 20 extending through the spaced extrusions 16 and through the spacers 18. While in the illustrated construction, a single beam 12 is shown, in other arrangements the measuring bridge could include a pair of parallel beams 12. In the illustrated construction, each elongated extrusion 16 is generally rectangular in cross section but includes beveled corners. The set-up beams 14 each have a construction which is the same as that of the main beam and each include a pair of spaced apart extrusions 22 separated by spacers 18.

Means are also provided for supporting the set-up beams 14 for independent adjustable movement along the length of the main beam 12 and for adjustable movement in the direction of their longitudinal axes with respect to the main beam. While the set-up beams 14 could be supported by other structure, in the illustrated arrangement a tubular slide mount 24 surrounds the main beam 12 so as to be slideable on the main beam in the direction of its axis, and an identical tubular slide mount 26 is fixed to the top of the tubular slide mount 24 surrounding the main beam 12 and perpendicular thereto and houses the set-up beam 14 for slideable movement in the direction of the longitudinal axis of the set-up beam 14. Set screws (not shown) are provided for securing the slide mount 24 to the main beam 12 and the slide mount 26 to the set-up beam 14.

Each set-up beam 14 supports a pair of upwardly extending pointers 28 (FIG. 2) having upper ends adapted to engage reference points on a vehicle frame. More specifically, each pointer 28 is supported by a pointer slide mount 30 comprising a length of a tubular extrusion adapted to surround a portion of the set-up beam 14 and having inside dimensions slightly larger than the exterior dimensions of the set-up beam 14 such that the slide mount 30 is slideable along the length of the set-up beam 14. A set screw 32 is threaded through one lower corner of the slide mount 30 and is adapted to engage the set-up beam 14 to selectively secure the slide mount in place on the beam. In the illustrated arrangement the slide mount also includes a pair of nylon slides 36 adapted to support the slide mount for slideable movement along the top of the set-up beam 14. The pointer slide mount 30 also includes a central upwardly extending collar or pointer support 38 (FIG. 3) including a central bore 40 adapted to house the pointer 28. The lower end of the pointer 28 can extend downwardly through the slide mount 30 and through the space between the tubular extrusions 22 forming the set-up beam 14. A thumb screw 42 (FIG. 4) is threaded through the collar 38 and engages the pointer 28 for fixing the vertical position of the pointer 28 with respect to the slide mount 30 and set-up bar 14.

The apparatus embodying the invention also includes at least one measuring beam 44 supported by the elongated main beam 12 and a pair of slide mounts 24 and 26 in the same manner as the set-up beams 14 for selective adjustable movement along the length of the main beam 12 and for adjustable movement in the direction perpendicular to the axis of the elongated main beam. The measuring beams 44 can each have a construction which is the same as that of the main beam 12 and the set-up beams 14. The measuring beam supports one or more measuring pointers 46 each supported by a pointer slide mount 30.

Means are also provided for supporting the set-up beams 14 and the main beam 12 in elevated relation with respect to a floor and for biasing the upper ends of the set-up pointers 88 upwardly into engagement with the vehicle reference points. The set-up pointers 28 will then support the set-up beams 14 and the main beam 12 such that they define a reference plane.

In a preferred arrangement, set-up pointers 28 are provided generally at the opposite ends of each of the set-up beams 14 and are intended to be located beneath reference points on the vehicle frame and to engage the reference points and establish a reference plane. The measuring pointers 46 can then be used to determine the relative position of other points of the vehicle frame with respect to the reference points. As shown in FIG. 4, metric scales 48 are provided extending along the length of each of the measuring pointers to permit determination of the vertical position of a point to be measured with respect to the reference plane established by the set-up pointers. Metric scales 50 (FIG. 4) are also provided along the length of each of the measuring beams 44, and the set-up beams 14 as well as along the length of the main beam to permit measurement of the position of the measuring pointer away from the axis of the main beam and the position of the measuring beam or set-up beam along the length of the main beam 12. The measuring bridge can thus be used in measuring various points on a damaged vehicle to determine the amount of damage to a vehicle and the relative position of frame components. The measuring bridge can also be used during the repair operation to indicate the position of vehicle components as they are being bent to the proper position.

Figure 6:
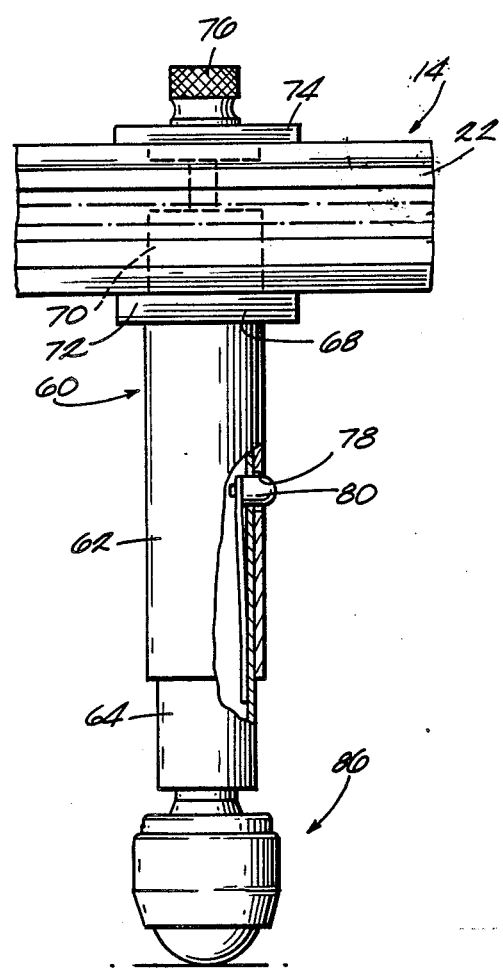
FIG. 6 is a side-elevation view of the supporting leg illustrated in FIG. 5 and with portions shown in cross-section.

In the illustrated arrangement the means for supporting the main beam, the set-up beams and the measuring beams in spaced relation from the floor, includes a plurality of telescoping leg assemblies 60 (FIGS. 2, 5 and 6) each including an upper leg section 62 and a lower leg section 64 in telescoping relation. A compression spring 66 is housed in the telescoping leg sections 62 and 64 and biases them toward an extended position. In the particular arrangement shown in the drawings, the compression spring 66 is housed in the upper leg section 62.

Means are also provided for securing the legs 60 to the set-up beams. In the illustrated arrangement a T-shaped block 68 is fixed to the upper end of the upper leg section 62 and includes an upper end 70 housed in the central space of one of the set-up beams 14 and a pair of flanges 72 supporting the bottom of the set-up beam. A locking block 74 extends across the top of the set-up beam, and a bolt 76 extends through the locking block 74 down into the lower block 68 to permit the blocks 68 and 74 to clampingly engage the set-up beam 14.

Means are also provided for releaseably holding the telescoping legs 60 in a compressed or non-extended condition. In the illustrated arrangement, the upper telescoping leg portion 62 includes a bore 78 intermediate its opposite ends, and a detent pin 80, supported by a spring 82 fixed to the inner leg member, is engageable with the bore 78 in the outer leg member. The detent pin 80 can be manually pushed inwardly to release the detent and permit extension of the leg assembly.

In a preferred form of the invention the lower end 64 of the leg assembly is supported by ball caster 86 to provide for movement of the measuring bridge on the floor and for movement of the measuring bridge into position beneath a vehicle.

The reference bores provided in the bottom of the vehicle frame and engaged by the pointers 28 and 46 may be of different diameters depending on the vehicle manufacturer. As previously stated, the upper ends of the pointers 28 and 46 are conical to facilitate location of the reference holes by the pointers. Because the ends of the pointers are conical, they will project farther into a larger diameter reference hole than into a smaller diameter reference hole. Additionally, it is important that the pointers provide for an accurate measurement of the vertical position of the reference plane defined by the set-up beams and accurate measurement of the vertical position of the points being measured. The measuring bridge embodying the invention includes means for compensating for differences in the diameters of the reference holes in the frame such that the relative position of points of the frame can be accurately measured without calculation of factors compensating for hole size variations. The compensating means includes a sleeve or cap 88 (FIGS. 3-4) surrounding the upwardly projecting collar 38 of the pointer slide mount 30, the sleeve 88 including an upper portion or top 90 having a central bore 92 adapted to house the pointer 28 or 46 and a lower portion 94 surrounding the collar 38 and having a first vertically extending slot adapted to house the set screw 42 extending through the threaded bore in the collar and engageable with the pointer to secure the pointer with respect to the collar. The lower portion 94 of the sleeve 88 further includes a second slot 96 (FIG. 4) adapted to house a set screw 98 threaded into the collar 38, and for use in adjustably securing the sleeve 88 to the collar 38. In a preferred form of the invention the sleeve 88 will be comprised of transparent plastic material and a scale 100 is provided on the sleeve 88, the scale 100 including markings for identifying the proper vertical positioning of the sleeve 88 with respect to the upper surface of the collar. The scale 100 is calibrated to identify the proper height of the sleeve 88 with respect to the collar 38 depending of the size of the hole to receive the end of the pointer 28 or 46 and to compensate for the vertical height of insertion of conical end of the pointer into the vehicle frame. When the sleeve is properly positioned on the collar, the set screw 96 is tightened to secure the sleeve to the collar. As previously stated the pointer 28 or 46 includes a scale 48 on one side, and the scale of the pointer indicates the vertical extension of the Pointer with respect to the top of the sleeve 88. The compensation apparatus provided by the invention provides an uncomplicated means for calibrating the vertical position of pointers and minimizes calculations otherwise required to compensate for positioning of conical points in reference holes of various sizes.

While the measuring bridge 10 embodying the invention could include more or fewer measuring beams 44, in the illustrated arrangement the measuring bridge includes three measuring beams 44 for supporting pointers 46 adapted to engage points to be measured on the bottom of the vehicle, and a bridge assembly 110 for supporting a plurality of additional pointers (not shown) intended to measure the relative position of reference points of the body or frame of the vehicle. The bridge assembly 110 includes a pair of parallel relatively closely spaced bridge beams 112 each supported by the main beam 12 in the same manner as the measuring beams 44 and the set-up beams 14. The opposite ends of one of the bridge beams 112 each support a vertically upwardly extending frame member 114, and an upper cross bar 116 joins the upper ends of the vertically extending frame members 114. The vertically extending frame members 114 and the cross bar 116 can each support a plurality of measuring pointers. A triangular brace 118 is provided for stabilizing the vertically extending frame members 114. In the illustrated arrangement, the ends of the bridge beams are also joined by outrigger assemblies 120 each including a cross member 122 and a pair of downwardly extending legs 124.

Various features of the invention are set forth in the following claims.

What is claimed is:

1. A measuring bridge for determining the orientation of measured points on a motor vehicle with respect to reference points; the measuring bridge comprising:
    an elongated main beam;
    a pair of set-up beams connected to the elongated beam, the set-up beams being positioned in spaced apart parallel relation and extending generally perpendicularly to the elongated main beam, the set-up beams each including opposite ends, and the set-up beams and the elongated main beam being adapted to be positioned beneath a vehicle;
    vertically extending set-up pointers supported by the set-up beams and including upper ends adapted to engage reference points on the motor vehicle;
    means for connecting the set-up pointers to the set-up beams for adjustable movement along the length of the set-up beams;
    at least one measuring beam connected to the elongated main beam and extending generally perpendicularly to the elongated main beam;
    a measuring pointer supported by the measuring beam; and
    means for resiliently supporting the set-up beams such that the set-up pointers are selectively biased upwardly against the vehicle frame, the means for resiliently supporting including a plurality of extensible legs.

2. A measuring bridge as set forth in claim 1 wherein the resiliently extensible legs each include a first leg portion and a second leg portion joined together in telescoping relation such that the first leg portion and second leg portion are extensible, and a compression spring housed in at least one of the first leg and the second leg portion, the compression spring biasing the leg portions toward an extended position.

3. A measuring bridge as set forth in claim 2 and further including means for releaseably maintaining the first leg portion and the second leg portion in a retracted position wherein the measuring bridge can be positioned beneath a vehicle.

4. A measuring bridge as set forth in claim 3 wherein the means for releaseably maintaining the first leg portion and the second leg portion in the retracted position includes a spring loaded detent supported by one of the first leg portion and the second leg portion and engageable with the other of the first leg portion and the second leg portion.

5. A measuring bridge as set forth in claim 1 wherein each of the resiliently extensible legs includes a first portion supporting one of the set-up beams, a second portion which is vertically movable with respect to the first portion between a longitudinally compressed position and an extended position, a compression spring between the first leg portion and the second leg Portion for resiliently biasing the first leg portion upwardly with respect to the second leg portion, and means for selectively restraining the first leg portion and the second leg portion in compressed relation.

6. A measuring bridge as set forth in claim 5 wherein the means for releaseably restraining includes a pin supported by one of the first portion and the second portion and engageable with the other of the first portion and the second portion.

7. A measuring bridge as set forth in claim 5 wherein the first portion and second portion are joined together in telescoping relation and the compression spring is housed in at least one of the telescoping first portion and second portion.

8. A measuring bridge as set forth in claim 1 wherein leg assemblies are provided for supporting opposite ends of each set-up beam.

9. A measuring bridge as set forth in claim 1 wherein each leg assembly includes a lower end supported by a ball caster for rolling movement on a floor.

10. A measuring bridge as set forth in claim 1 and wherein at least one of the means for supporting the set-up pointers includes a collar supported by one of the beams, and the collar including a central vertically extending bore, a sleeve surrounding the collar, the sleeve being supported on the collar for vertically adjustable movement, the sleeve including means for supporting a vertically extending pointer for movement with the sleeve, and wherein the sleeve includes a scale.

11. A measuring bridge for determining the orientation of measured points on a motor vehicle with respect to reference points; the measuring bridge comprising:
    an elongated main beam;

a pair of set-up beams connected to the elongated beam, the set-up beams being positioned in spaced apart parallel relation and extending generally perpendicularly to the elongated main beam, the set-up beams each including opposite ends, and the set-up beams and the elongated main beam being adapted to be positioned beneath a vehicle;

vertically extending set-up pointers supported by the set-up beams and including upper ends adapted to engage reference points on the motor vehicle;

means for connecting the set-up pointers to the set-up beams for adjustable movement along the length of the set-up beams, the means for connecting including means for supporting the set-up pointers for vertical adjustable movement;

at least one measuring beam connected to the elongated main beam and extending generally perpendicularly to the elongated main beam; and a measuring pointer supported by the measuring beam;

the means for supporting the set-up pointers including a pointer support member supported by one of the beams, and the pointer support member including a central vertically extending bore adapted to house a pointer, and a compensating member surrounding the pointer support member, the compensating member being supported on the pointer support member for vertically adjustable movement, and means for adjusting the position of the compensating member with respect to the pointer support member, and the compensating member including a measurement scale.

* * * * *